July 15, 1969 D. V. CHENOWETH 3,455,382
INJECTION FLOW CONTROL APPARATUS FOR WELLS
Filed July 14, 1967 2 Sheets-Sheet 1
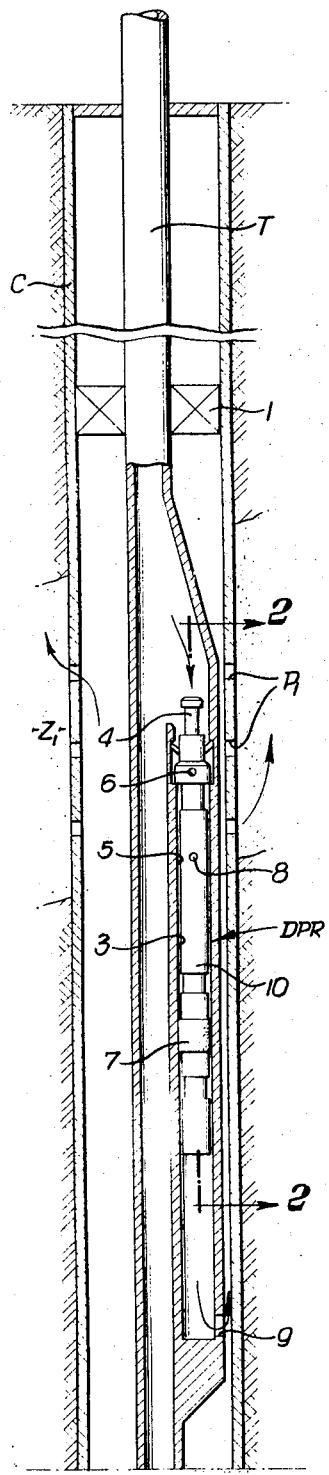
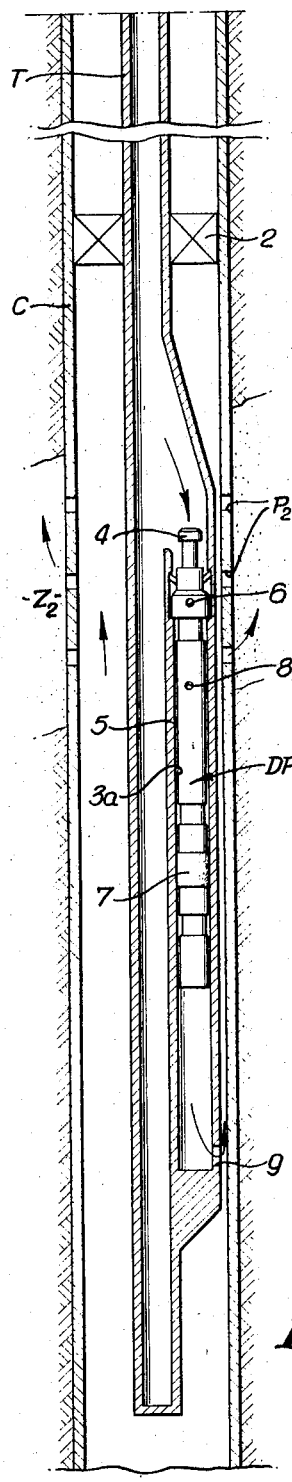
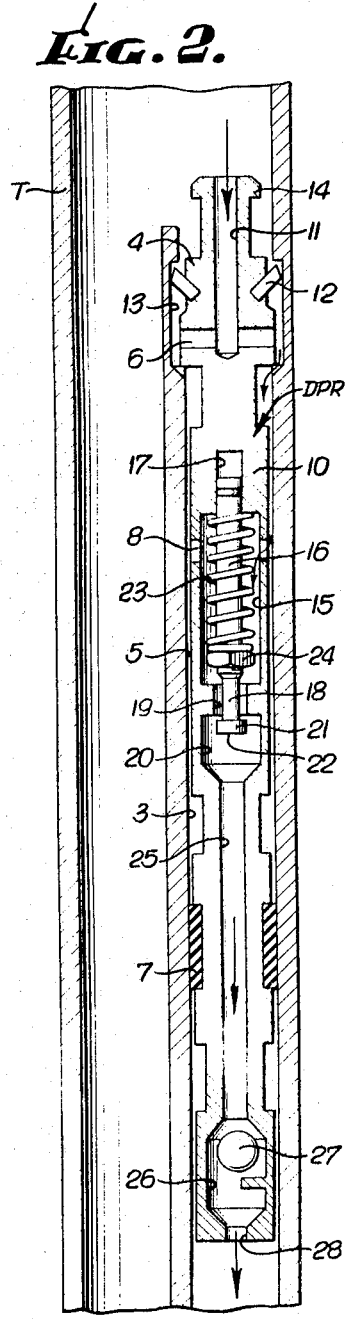
INVENTOR.
DAVID V. CHENOWETH
By Bernard Kriegel
ATTORNEYS.

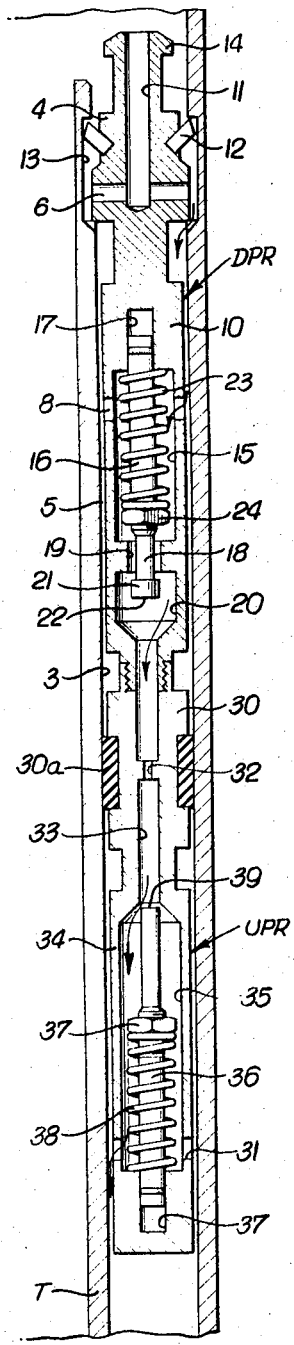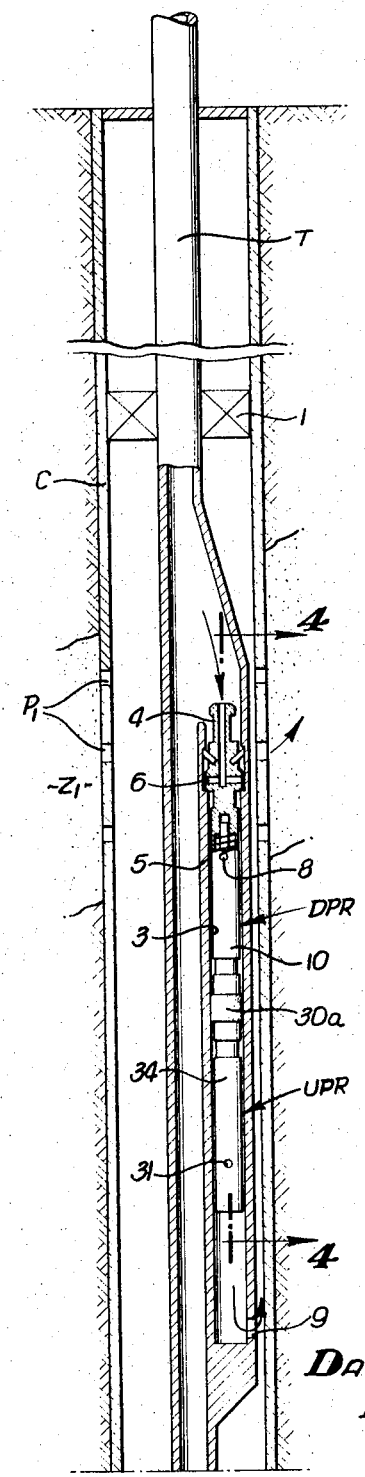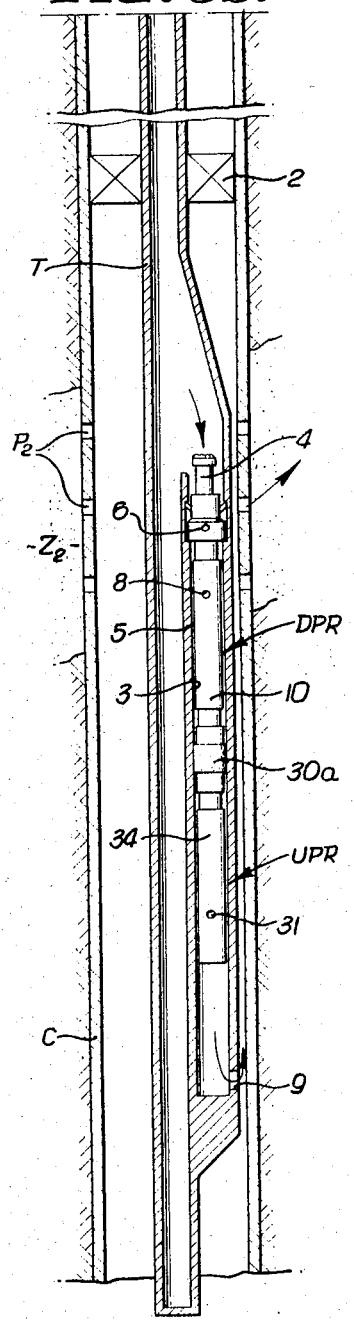

United States Patent Office 3,455,382
Patented July 15, 1969

3,455,382
INJECTION FLOW CONTROL APPARATUS FOR WELLS
David V. Chenoweth, Houston, Tex., assignor to Baker Oil Tools, Inc., City of Commerce, Calif., a corporation of California
Filed July 14, 1967, Ser. No. 653,374
Int. Cl. E21b *33/12, 43/16*
U.S. Cl. 166—147
19 Claims

ABSTRACT OF THE DISCLOSURE

Flow control apparatus for fluid conduits such as the tubing string in a well through or with which a compressible fluid, such as gas, is to be injected, for maintaining a constant mass rate of injection.

---

The present invention relates to flow control apparatus, and more particularly to flow control apparatus useful in regulating the flow of a compressible fluid in a conduit, as from the surface of the earth, through a well bore and into one or more subsurface well zones.

It is sometimes the practice to inject compressible fluids, such as gas or liquid bearing gas, through well pipe or tubing into one or more well zones, either for the purpose of stimulating the production of formation fluids from such zone or zones, or for the purpose of driving such formation fluids to adjacent wells, or sometimes for the purpose of merely repressuring the subsurface earth formation.

An object of the present invention is to provide apparatus for controlling the fluid being injected during the course of its flow into the formation so that the mass rate of injection will be constant, either by maintaining a constant pressure at the formation face or by regulating the flow of injection fluid through an orifice located upstream of the pressure face.

A specific object of the invention is to provide well flow control apparatus which may comprise a downstream pressure regulator, which reacts to the pressure of fluid downstream therefrom so as to maintain a constant back pressure at the valve and a constant pressure on the formation face.

Another specific object of the invention is to provide well flow control apparatus including a downstream pressure regulator, which acts to maintain a constant pressure at the upstream side of an orifice, the pressure at the downstream side of the orifice being held constant by an upstream pressure regulator, so that there is maintained a constant mass rate of flow of fluid through the orifice regardless of changes in the upstream pressure or downstream pressure, or, if used in a well, changes in the tubing pressure or the formation pressure.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIGURES 1a and 1b are longitudinal sectional views, schematically showing flow control apparatus in accordance with the invention installed at multiple zones in a well bore, FIG. 1b being a downward continuation of FIG. 1a;

FIG. 2 is a longitudinal sectional view through one of the flow control assemblies as taken on the line 2—2 of FIG. 1a;

FIGS. 3a and 3b are longitudinal sectional views, schematically showing another flow control apparatus in accordance with the invention at multiple zones in a well bore, FIG. 3b being a downward continuation of FIG. 3a; and FIG. 4 is a longitudinal sectional view through one of the flow control assemblies of FIGS. 3a and 3b, as taken on the line 4—4 of FIG. 3a.

Referring first to FIGS. 1a and 1b, flow control apparatus is illustrated as installed in a well production tubing T which leads from a plurality of well zones to the top of the well bore, which well bore has had a well casing C set therein, the casing having been provided with perforations P1 in an upper well zone Z1, and with perforations P2 in the region of a lower well zone Z2.

In the injection of fluids into the earth formations Z1 and Z2 through which the well bore extends, it is desirable that the fluid be conducted from the earth's surface through a single pipe or tubing T, and that the mass rate of fluid injected into each formation zone be regulated, depending upon the characteristics of the particular zone or upon the nature of the fluid being injected. Thus, the present invention provides, in the apparatus shown in FIGS. 1a and 1b, means for maintaining a constant mass rate of flow from the tubing T into each of the zones Z1 and Z2 by maintaining a constant pressure on the formation regardless of changes in the pressure in the tubing.

As seen in FIGS. 1a and 1b, an upper well packer 1 of any known type is set in the well bore and forms a seal with the tubing T and with the casing C above the zone Z1. A second similar packer 2 is set in the well in sealing engagement with the tubing T and the casing C between the zone Z1 and the zone Z2, so as to isolate the zones from one another. It will be understood that, if desired, still another such packer may be set below the zone Z2 to isolate it from any subjacent zone or from the casing below the flow controlling apparatus. In the tubing T, there is provided a side pocket 3 for the upper zone Z1 in which, in a well known manner, flow control apparatus, generally designated DPR, and in the present embodiment comprising a downstream pressure regulator, may be installed by running the same into the well through the tubing T on a wire line tool (not shown) releasably connected to a running and recovery head 4 at the upper end of the downstream pressure regulator DPR. A second side pocket 3a is provided in the tubing string T for the well zone Z2, and in this side pocket 3a is another similar flow control device, also designated DPR, and constituting a downstream pressure regulator.

As indicated by the arrows in FIG. 1a, injection fluid may be caused to flow downwardly through the tubing T at a pressure and rate dependent upon the equipment located at the surface of the earth. A portion of the fluid from the tubing T may find access into the downstream pressure regulator DPR in side pocket 3 through the running and recovery head 4, as well as around the latter, into an annular clearance 5 defined between the regulator DPR and the inside wall of the side pocket 3, the running and recovery head 4 having a number of ports 6 to facilitate such flow. The downstream pressure regulator DPR includes suitable sealing means such as a packing 7, which forms a seal at the lower end of the annular space 5, and fluid will flow from the latter into the regulator through a number of ports 8. The fluid will flow from the lower end of the regulator and thence from the side pocket 3 through ports 9 into the isolated zone of the casing C between the packers 1 and 2. From the casing C, the fluid can then pass through the casing perforations P1 into the well zone Z1.

Referring to FIG. 1b, it will be noted that a portion of the fluid flowing downwardly through the tubing T may also find its way to the pressure regulator DPR in the side pocket 3a, which is, for illustrative purposes, the same as the downstream pressure regulator in the side pocket 3.

More specifically with reference to FIG. 2, the details of the downstream pressure regulator in the side pocket 3 are shown as representative of the downstream pressure regulators DRP in both of the side pockets 3 and 3a.

The downstream pressure regulator DPR will be seen to include an elongated body 10 (FIG. 2) connected at its upper end to the running and recovery head 4. The head 4 includes, in addition to the lateral ports 6, an axially extended passage 11 and latch means 12 in the form of fingers engageable in an enlarged groove or channel 13 formed in the side pocket 3. The running and recovery head is conventional and well known in the art as a means for releasably holding or latching devices in side pockets of tubing, and, therefore, needs no further description herein, except to note that it also includes the usual enlarged flange 14 which provides means engageable by the typical running tool. If desired, the running and recovery head 4 may be provided with valve means, and more particularly may be constructed in accordance with the disclosure of my application Ser. No. 488,943, filed Sept. 21, 1965, now Patent No. 3,371,717.

As previously described, the inlet ports 8 provide access to the downstream pressure regulator for the downwardly flowing fluid. The ports 8 lead into an elongated chamber 15 within the regulator body 10, in which is disposed an elongated stem 16. The upper end of the stem 16 is sealingly disposed in a chamber 17 formed in the body 10 and providing a space at atmospheric pressure. At the other end of the stem, it is provided with throttle valve means, including a stem section 18, which extends axially through a passage 19 in the body 10 leading from the chamber 15 into a downstream chamber 20. On the stem section 18 within the downstream chamber 20 is a throttle valve head 21 having an end face 22 of a cross-sectional area equal to the cross-sectional area of the stem end in the atmospheric chamber 17. Within the body chamber 15 is a spring 23 which shoulders against an adjustable nut 24 on the stem 16 and against the housing 10 at the upper end of the chamber 15, so as to provide a selected spring force tending to move the stem downwardly against the force acting to move the stem 16 upwardly, this upward force being derived from the pressure in the downstream chamber 20 acting on the end surface 22. Downstream of the chamber 20 is a passage 25 which leads to a check valve chamber 26, in which is disposed an upwardly closing ball check valve 27 which may be employed, if desired, for the purpose of preventing backflow through the assembly. The ball valve chamber 26 opens through a port 28 into the side pocket 3 below the packing 7, and, as previously described, fluid passing through the port 28 may find access to the casing C through side pocket ports 9, and thence the fluid may flow into the subsurface earth formation.

In the operation of the structure as shown in FIG. 2, it will now be apparent that fluid flowing through the conduit or tubing T into the side pocket 3 through passage 11 of recovery head 4, or around the same through the enlarged groove 13, will find access to the annulus 5, and from the latter may pass through ports 8 into the regulator chamber 15. From the chamber 15, fluid may flow through the throttle valve passage 19 into the downstream chamber 20 and from the latter, as previously described, into the formation. Inasmuch as the flow of fluid through the throttle valve passage 19 will be regulated as a function of the back pressure in downstream chamber 20 acting on the end face 22 of the throttle valve head 21, to provide an upward force tending to shut off flow, while the spring 23 urges the throttle valve head 21 to open the same, and the upper end of the stem 16 is in the atmospheric chamber, while the remainder of the stem is pressure balanced in the sense that there is no pressure responsive area thereon tending to produce a force in either direction, there is the tendency for the mass rate of flow to be maintained at a constant value. In this connection, if the pressure acting in the downstream chamber 20 on the end face 22 of the throttle valve tends to increase, there will be produced a force which will tend to close off the flow area through the passage 19, but if the pressure in the downstream chamber tends to decrease, then the spring 23 will produce a force which will move the valve head 21 in a direction to increase the permitted flow into the downstream chamber, so as to increase the pressure in the latter and maintain the mass flow rate at a constant value.

Thus, there is provided, by virtue of the present invention, mass flow control apparatus installed in the conduit or tubing T whereby to control or maintain at a constant mass flow rate the transmission of fluid through a conduit, and more specifically between the tubing and the casing or formation. Another apparatus for accomplishing the control of the mass flow rate of a compressible fluid is illustrated in FIGS. 3a, 3b and 4.

In these views, as in the case of FIGS. 1a and 1b, the apparatus is disposed in the side pockets 3 and 3a provided in the tubing string and having ports 9 for establishing communication between the tubing and the casing between the packers 1 and 2 which isolate the well zones Z1 and Z2. As in the case of the first described embodiment, there is a downstream pressure regulator DPR having inlet ports 8 in the body 10, but below the body 10 it is connected to an upstream pressure regulator UPR by an intermediate coupling, or the like, generally denoted at 30, whereby, in a manner which will hereinafter be more fully described, fluid passing downwardly through the tubing to the respective zones will flow from the downstream pressure regulator through the coupling 30 and into the upstream pressure regulator, from which it will pass into the side pockets 3 and 3a through ports 31 in the upstream pressure regulator UPR. From the ports 31, fluid will then find its way to the side pocket ports 9 referred to above, and then to the perforations P1 and P2 in the casing C at the respective zones Z1 and Z2.

In order to prevent the flow of fluid around the exterior of the combined downstream pressure regulator and upstream pressure regulator, the coupling 30 referred to above may be provided with a suitable packing or seal 30a engaged with the inside wall of the side pocket 3 or with the side pocket 3a, as the case may be, and dividing the annular space 5 into an upper section which communicates through ports 8 with the downstream pressure regulator DPR and a lower section which communicates through ports 31 with the upstream pressure regulator UPR.

Referring now to FIG. 4, there is shown in greater detail a representative assembly of a downstream pressure regulator DPR and an upstream pressure regulator UPR, as generally illustrated in FIGS. 3a and 3b. In FIG. 4, the downstream pressure regulator DPR is the same as that shown in detail in FIG. 2, and, therefore, the same reference numerals have been applied, it being notable that at its upper end the downstream pressure regulator DPR is jointed with the running and recovery head 4, so that the combined regulator assembly may be run into and retrieved from the side pocket in the conventional manner on wireline equipment.

Downstream of the downstream chamber 20 of the downstream pressure regulator and, for example, in the coupling 30 is an orifice 32 through which fluid flowing through the assembly will pass into an inlet passage 33 of the upstream pressure regulator UPR. This pressure regulator UPR includes a body 34 which defines an interior elongated chamber 35 having reciprocably disposed therein a stem 36.

The lower end of the stem 36 is sealingly and reciprocably disposed in a chamber 37a at atmospheric pressure, and, as in the case of the downstream pressure regulator, the upstream pressure regulator stem 36 has an adjustable nut 37 engaged by one end of a spring 38, the other end of which abuts at the base of the body chamber 35 so as to provide an upward force acting on the stem 36. The upward force of the spring 38 will be opposed by the pressure of fluid in the upstream pressure regulator inlet passage 33, which will act on the exposed end 39 which provides the only effective cross-sectional stem area responsive to fluid pressure.

Thus, it will now be apparent that any tendency of the pressure in the inlet 33 to increase will increase the effective force acting downwardly on the stem 36, tending to move the same in a valve opening direction, which will lessen the effect of the throttling valve action, thereby reducing the pressure in the inlet 33; whereas, any tendency of the pressure in the chamber 33 to be reduced will result in a reduction in the effective force acting downwardly on the stem 36, so that the force derived from spring 38 will tend to move the stem upwardly to further throttle the flow of fluid through the passage 33 so as to maintain a constant pressure in the passage 33.

Inasmuch as the downstream pressure regulator DPR functions to maintain a substantially constant downstream pressure in the chamber 20 at the upper or upstream side of the orifice 32, and the upstream pressure regulator UPR tends to maintain a constant pressure in the inlet passage 33 on the downstream side of the orifice, the pressure drop through the orifice 32 will be maintained substantially constant, and there will result a constant mass rate of flow through the apparatus, regardless of variations in the pressure in the tubing, and regardless of variations in the pressure at the formation Z1 or formation Z2. If installed in a pipeline, the combined downstream pressure regulator, orifice, and upstream pressure regulator will maintain constant the density of a compressible fluid flowing through the orifice, as well as its rate of flow.

Here again, as in the case of the embodiment of FIGS. 1a, 1b and 2, the just described embodiment will function to maintain a constant mass flow rate through the conduit constituted by the tubing T between the earth's surface and the respective well zones, and it will be further understood that inasmuch as the effective spring force may be adjusted at each of the regulators DPR and UPR, the mass rate of flow may be predetermined in a simple manner, without need for complex calculations. Moreover, the respective combined regulators DPR and UPR at the respective zones Z1 and Z2 may be differently adjusted, so as to provide for the flow of fluid between the earth's surface and the respective formations at different rates.

I claim:

1. In apparatus for conducting a compressible fluid from the top of a well to a well zone at a constant mass rate: a tubing string in the well bore, packing means set in the well bore in sealed relation to said tubing string to confine the fluid to a flow path through said tubing string, and regulator means interposed in said path of fluid flow for automatically maintaining the fluid flow at a constant mass rate regardless of variations in the pressure of fluid in the tubing.

2. Appaartus as defined in claim 1, wherein said regulator means includes downstream pressure regulator means having a throttle valve responsive to the pressure of fluid at said formation.

3. Apparatus as defined in claim 1, wherein said regulator means includes a combined downstream pressure regulator and an upstream pressure regulator, and means providing an orifice therebetween, the respective regulators including throttle valve means responsive to fluid at opposite sides of said orifice for maintaining the pressure at opposite sides of said orifice at a constant value, whereby the flow through said orifice will be at a constant mass rate.

4. Apparatus as defined in claim 1, wherein said regulator means comprises a pressure regulator having a body provided with a chamber therein, passages leading into and from said body chamber, a stem reciprocably disposed in said body, said body having a chamber at atmospheric pressure in which one end of said stem is reciprocably and sealingly disposed, throttle valve means at the other end of said stem including a portion of the other end of said stem having a fluid pressure responsive area for moving said stem in one direction, and a spring in said body acting on said stem for moving the same in the other direction, the remainder of said stem being pressure balanced.

5. Apparatus as defined in claim 4, wherein said throttle valve means includes a stem section extending through the passage leading from said body chamber, a valve head on said stem section, said body having a downstream chamber in which said valve head is disposed.

6. Apparatus as defined in claim 4, wherein said throttle valve means has a portion on said stem exposed to the pressure of fluid in the passages leading into said body chamber.

7. Apparatus as defined in claim 1, wherein means are provided for releasably securing said regulator means in said tubing string.

8. Apparatus as defined in claim 1, wherein said tubing string is provided with a side pocket, and including means releasably securing said regulator means in said side pocket and providing a flow passage into said side pocket, said side pocket having an outlet flow passage leading into said well bore, and sealing means forming a seal with said regulator in said side pocket between said flow passages.

9. Apparatus as defined in claim 8, wherein said regulator means includes downstream pressure regulator means upstream of said seal and upstream pressure regulator means downstream of said seal, and an orifice between said upstream and downstream pressure regulator means, the respective pressure regulator means including throttle valve means for maintaining a substantially constant pressure upstream of said orifice and a substantially constant pressure down stream of said orifice.

10. In apparatus for conducting a compressible fluid from the top of a well bore to a plurality of subsurface earth zones traversed by the well bore: a tubing string in the well bore, packing means set in the well bore in sealing relation to said tubing string to isolate the respective zones from one another, flow control means in the tubing string for the respective zones, each of said flow control means including regulator means interposed in the path of fluid flow between the tubing string and each zone for automatically maintaining the fluid flow at a constant mass rate regardless of variations in the pressure of fluid in the tubing string.

11. Apparatus as defined in claim 10, wherein said regulator means includes downstream pressure regulator means having a throttle valve responsive to the pressure of fluid at said formation.

12. Apparatus as defined in claim 10, wherein said regulator means includes a combined downstream pressure regulator and an upstream pressure regulator, and means providing an orifice therebetween, the respective regulators including throttle valve means responsive to fluid at opposite sides of said orifice for maintaining each pressure at opposite sides of said orifice at a constant value, whereby the flow through said orifice will be at a constant mass rate.

13. In apparatus for controlling the flow of a compressible fluid through a conduit, means providing an orifice in the path of fluid flow through said conduit, downstream pressure regulator means in said conduit upstream of said orifice, upstream pressure regulator means in said conduit downstream of said orifice, each of said downstream and upstream pressure regulator means having throttle valve means at its side of said orifice, said throttle valve means including spring means acting on the throttle valve means and a fluid pressure responsive area on which fluid pressure can act opposing said spring means.

14. Apparatus as defined in claim 13, wherein said throttle valve means comprises a stem, said pressure responsive area being at one end of said stem, and means for exposing the other end of said stem to atmospheric pressure.

15. In apparatus for conducting a compressible fluid between the top of a well and a well zone at a constant mass rate: a tubing string in the well bore, packing means set in the well bore in sealed relation to said tubing string to confine the fluid to a flow path between said tubing string and well zone, and regulator means interposed in said path of fluid flow for automatically variably throttling the fluid flow to maintain the fluid flow at a constant mass rate regardless of variations in the pressure of fluid on the downstream side of said regulator means.

16. Apparatus as defined in claim 15, wherein said regulator means includes a downstream pressure regulator and an upstream pressure regulator, and means providing an orifice therebetween, each of the respective regulators including throttle valve means responsive to fluid at opposite sides of said orifice for maintaining the pressure at each side of said orifice at a constant value, whereby the flow through said orifice will be at a constant mass rate.

17. In apparatus for conducting a compressible fluid between the top of a well and a well zone at a constant mass rate: a tubing string in the well bore, packing means set in the well bore in sealed relation to said tubing string to confine the fluid to a flow path between said tubing string and well zone, and regulator means interposed in said path of fluid flow for automatically maintaining the fluid flow at a constant mass rate regardless of variations in the pressure of fluid on the downstream side of said regulator means, wherein said regulator means comprises a pressure regulator having a body provided with a chamber therein, passages leading into and from said body chamber, a stem reciprocably disposed in said body, said body having a chamber at atmospheric pressure in which one end of said stem is reciprocably and sealingly disposed, throttle valve means at the other end of said stem including a portion of the other end of said stem having a fluid pressure responsive area for moving said stem in one direction, and a spring in said body acting on said stem for moving the same in the other direction, the remainder of said stem being pressure balanced.

18. In apparatus for conducting a compressible fluid between the top of a well bore and a plurality of subsurface earth zones traversed by the well bore: a tubing string in the well bore, packing means set in the well bore in sealing relation to said tubing string to isolate the respective zones from one another, flow control means in the tubing string for the respective zones, each of said flow control means including regulator means interposed in the path of fluid flow between the tubing string and each zone for automatically variably throttling the fluid flow to maintain the fluid flow at a constant mass rate regardless of variations in the pressure of fluid on the downstream side of said regulator means.

19. Apparatus as defined in claim 18, wherein said regulator means includes a downstream pressure regulator and an upstream pressure regulator, and means providing an orifice therebetween, each of the respective regulators including throttle valve means responsive to fluid at opposite sides of said orifice for maintaining each pressure at opposite sides of said orifice at a constant value, whereby the flow through said orifice will be at a constant mass rate.

References Cited
UNITED STATES PATENTS

| | | | |
|---|---|---|---|
| 2,537,066 | 1/1951 | Lewis | 166—191 X |
| 2,869,645 | 1/1959 | Chamberlain et al. | 166—224 X |
| 2,973,039 | 2/1961 | Payne | 166—224 |
| 3,022,829 | 2/1962 | Hodges | 166—45 X |
| 3,319,717 | 5/1967 | Chenoweth | 166—115 |
| 3,362,477 | 1/1968 | Brandt | 166—10 X |

DAVID H. BROWN, Primary Examiner

U.S. Cl. X.R.

166—115, 208, 224, 269